(12) United States Patent
Semen

(10) Patent No.: US 6,596,198 B1
(45) Date of Patent: Jul. 22, 2003

(54) ADDITIVE SYSTEM FOR POLYMERS IN PELLET FORM WHICH PROVIDES PROPORTIONED STABILIZATION AND INTERNAL MOLD RELEASE CHARACTERISTICS

(75) Inventor: John Semen, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/561,268

(22) Filed: Apr. 28, 2000

(51) Int. Cl.[7] .................... C09K 15/32; C09K 15/30; C09K 15/08
(52) U.S. Cl. ................ 252/400.24; 252/400.53; 252/403; 252/407
(58) Field of Search .................. 254/400.24, 400.53, 254/403, 407

(56) References Cited

U.S. PATENT DOCUMENTS

| | | | |
|---|---|---|---|
| 3,664,961 A | 5/1972 | Norris ................... 252/99 |
| 3,781,397 A | 12/1973 | Gauer et al. .......... 264/142 |
| 4,038,477 A | 7/1977 | Inoue et al. .......... 528/487 |
| 4,077,902 A | * 3/1978 | Moser et al. ........ 252/400.24 |
| 4,098,858 A | 7/1978 | Ten Broeck .......... 264/117 |
| 4,101,512 A | 7/1978 | Schmidt et al. ...... 260/45.95 C |
| 4,134,725 A | 1/1979 | Buchel et al. ............ 8/79 |
| 4,438,263 A | 3/1984 | Morse .................. 536/56 |
| 4,439,570 A | 3/1984 | Messina et al. ....... 524/154 |
| 4,442,017 A | * 4/1984 | Blumberg et al. ..... 252/301.21 |
| 4,443,572 A | 4/1984 | Burns ................... 524/120 |
| 4,446,086 A | 5/1984 | Molenaar et al. ...... 264/118 |
| 4,510,073 A | 4/1985 | Hara et al. ............ 252/383 |
| 4,560,527 A | 12/1985 | Harke et al. .......... 264/500 |
| 4,594,444 A | 6/1986 | Orban .................. 560/67 |
| 4,670,181 A | 6/1987 | Mollinger et al. ..... 252/186.25 |
| 4,692,170 A | 9/1987 | Santambrogio et al. .... 44/63 |
| 4,716,244 A | 12/1987 | Orban .................. 560/75 |
| 4,761,247 A | 8/1988 | Rei et al. .............. 252/364 |
| 4,761,248 A | 8/1988 | Clift .................... 252/527 |
| 4,764,428 A | * 8/1988 | Gloyer ................. 428/402 |
| 4,806,580 A | 2/1989 | Bock et al. ............ 524/110 |
| 4,902,210 A | 2/1990 | Shibata ................. 425/6 |
| 4,929,654 A | 5/1990 | Wang et al. ........... 524/117 |
| 4,943,301 A | 7/1990 | Nagle et al. .......... 23/313 R |
| 4,956,406 A | 9/1990 | Myers et al. .......... 524/119 |
| 4,957,956 A | 9/1990 | Neri et al. ............. 524/120 |
| 5,006,284 A | 4/1991 | Gahan .................. 264/9 |
| 5,011,640 A | 4/1991 | Zanchetta ............. 264/69 |
| 5,030,400 A | 7/1991 | Danielsen et al. ....... 264/101 |
| 5,124,100 A | 6/1992 | Nishii et al. ........... 264/82 |
| 5,153,029 A | 10/1992 | Sharma ................ 427/213.36 |
| 5,190,579 A | 3/1993 | Gose et al. ............ 106/18 |
| 5,196,565 A | 3/1993 | Ross ................... 560/55 |
| 5,240,642 A | 8/1993 | Neri et al. ............. 252/399 |
| 5,290,495 A | 3/1994 | Numadate et al. ...... 264/141 |
| 5,292,461 A | 3/1994 | Juch et al. ............ 264/37 |
| 5,318,733 A | 6/1994 | Carduck et al. ........ 264/15 |
| 5,348,695 A | 9/1994 | Ploumen et al. ....... 264/42 |
| 5,358,560 A | 10/1994 | Hitch et al. ........... 106/499 |
| 5,382,377 A | 1/1995 | Raehse et al. ......... 252/174 |
| 5,460,765 A | 10/1995 | Derdall et al. ......... 264/117 |
| 5,462,984 A | 10/1995 | Neri et al. ............. 524/102 |
| 5,597,857 A | 1/1997 | Thibaut et al. |
| 5,606,007 A | 2/1997 | Sakashita et al. ....... 528/176 |
| 5,674,927 A | 10/1997 | Mahood ................ 524/119 |
| 5,700,497 A | 12/1997 | Stone et al. ........... 425/222 |
| 5,772,921 A | 6/1998 | Gilg et al. ............. 252/404 |
| 5,773,503 A | 6/1998 | Steen et al. ........... 524/445 |
| 5,844,027 A | 12/1998 | Burdick et al. ........ 524/110 |
| 5,844,042 A | 12/1998 | Neri et al. ............. 523/223 |
| 5,846,656 A | 12/1998 | Dunski |
| 6,033,600 A | 3/2000 | Henkins et al. ........ 252/400.24 |
| 6,056,898 A | 5/2000 | Semen ................. 252/400.24 |
| 6,077,890 A | 6/2000 | Hudson et al. ........ 524/100 |
| 6,126,862 A | 10/2000 | Semen .................. 252/404 |
| 6,126,863 A | 10/2000 | Semen .................. 252/404 |
| 6,143,814 A | 11/2000 | Schiller et al. ......... 524/303 |

FOREIGN PATENT DOCUMENTS

| | | |
|---|---|---|
| DE | 1629732 | 3/1971 |
| EP | 0525200 | 2/1993 |
| WO | 0017267 | 3/2000 |

OTHER PUBLICATIONS

Derwent Abstract 1980–90299C for DE 2922378, Dec. 10, 1980, "Non–dusting heavy metal salt–cont. stabilizer lubricant mixt.—for halo–contg. polymer esp. PVC, prepd. by mixing lubricant, lead cpd. and fatty acid in extruder".*
CAPLUS Abstract of JP 06254845, 1994.

* cited by examiner

*Primary Examiner*—Matthew A. Thexton
(74) *Attorney, Agent, or Firm*—Philip M. Pippenger

(57) ABSTRACT

A pelleted stabilizer additive system and a method of making same with a good pellet yield, preferably at least about 90 wt. %. The stabilizer additive system comprises at least a stabilizer and a processing aid, preferably a mold release agent. The processing aid has a lower melting temperature than the stabilizer. The stabilizer comprises less than 50 wt. % the combined total weight of the stabilizer and the mold release agent.

63 Claims, No Drawings

ADDITIVE SYSTEM FOR POLYMERS IN
PELLET FORM WHICH PROVIDES
PROPORTIONED STABILIZATION AND
INTERNAL MOLD RELEASE
CHARACTERISTICS

FIELD OF THE INVENTION

The present invention relates to pellets comprising an additive system comprising at least a stabilizer and a mold release agent. The stabilizer comprises less than 50 wt. % the combined total weight of the stabilizer and the mold release agent.

BACKGROUND OF THE INVENTION

Organic polymers, in particular polyolefins such as polyethylene and polypropylene, commonly are known as "plastics." Various additive systems are used during the processing of plastics in order to assure that the plastic product has long term stability and desired service properties. Additives and stabilizers prevent the plastic product from being damaged by light, heat, and by residues of the catalyst system used to produce the plastic.

Many commercially available additives are effective to protect against polymer discoloration and thermooxidative degradation. In the past, the protective additives were supplied in powder form, which led to difficulty in handling the additives. Powder additives are difficult to convey in the systems most commonly used in the plastics industry, and significant losses of the powders occur during conveying. Powder additives also are dusty, presenting a potential for dust explosion and potential health risks to workers, who either inhale the dust or whose skin comes into contact with the dust. Additionally, powders are difficult to meter accurately.

Forming pellets from the powders alleviates the problems described above; however, the operation of a pellet mill subjects the powdered components to shear forces. Increased temperatures caused by shear forces can cause the stabilizer to melt and fuse in the pellet mill, preventing the production of pellets. In order to avoid melting and fusing of the stabilizer in the pellet material, fatty acids, fatty alcohols, and/or their derivatives (sometimes collectively called "fatty acids") having a relatively low melting point are added to the stabilizer. Certain fatty acids also function as mold release agents during polymer part forming processes, such as injection molding, thermoforming, and the like.

Fatty acids produce acceptable product quality even at relatively high concentrations in most host plastics, with about 4000 ppm by weight to about 7000 ppm by weight generally being acceptable. However, acceptable product quality is achieved only using lower concentrations of the stabilizer—generally, from about 100 ppm by weight to as much as 4000 ppm by weight.

Pelleted additive systems are needed which have adequate pellet properties and which contain a relatively smaller concentration of stabilizer

SUMMARY OF THE INVENTION

The present invention provides a stabilizer additive system for a polymer host comprising pellets. The pellets comprise an amount of at least one stabilizer having a first melting point. The stabilizer is selected from the group consisting of an antioxidant, a UV light stabilizer, and a combination thereof. The pellets also comprise a quantity of at least one processing aid selected from the group consisting of a mold release agent, a lubricant, and a combination thereof. The processing aid has a second melting temperature lower than the first melting temperature. The amount of the stabilizer and the quantity of the processing aid comprise a combined total weight. The amount of the stabilizer is from a minimum amount effective to stabilize the polymer host to less than 50 wt. % of the combined total weight.

DETAILED DESCRIPTION OF THE INVENTION

The present invention provides pellets of an additive system for stabilizing polymeric materials against ultraviolet light and thermooxidative deterioration. The pellets contain a "reduced amount" of stabilizer in order to increase product quality. As used herein, the phrase "reduced amount" when used to refer to the stabilizer is defined to mean a concentration of less than 50 wt. % based on the combined weight of the mold release agent and the stabilizer. The pellets may be designed to produce a variety of concentrations and ratios of stabilizer/mold release agent in a host plastic. Preferably, the pellets comprise a concentration of stabilizer based on the combined weight of the mold release agent and the stabilizer of less than about 50 wt. %, preferably from about 5 wt. % to less than about 50 wt. %, more preferably from about 5 wt. % to about 40 wt. %, and most preferably from about 5 wt. % to about 10 wt. %. In a most preferred embodiment, the pellets comprise a compressed powder blend in which the weight ratio of the mold release agent(s) to the stabilizer(s) is from greater than about 1:1 to about 70:1, most preferably about 1:1 to about 10:1.

As used herein, the term "pellet" generally refers to granules made using extrusion techniques. "Pellets" may have substantially any shape, but typically are small, columnar or cylindrical bodies of a sterically hindered phenol antioxidant, and may have flat surfaces such as cubes, rectangular parallelepipeds, etc. The pellets are formed from a homogeneous mixture of powders of at least one stabilizing compound, a mold release agent, and may comprise other desired additives. Optional additives known in the art include, but are not necessarily limited to nucleating agents, clarifiers, pigments and colorants, metal deactivators, and acid neutralizers. The pellets are coherent enough to provide sufficient abrasion resistance during handling, but insufficiently coherent to interfere with dispersion of the additive system in a polymer host.

In order to form pellets, the powder blend is pressed through a die extruder to form strands. In a preferred embodiment for making the pellets, the powdered stabilizer, the powdered mold release agent, and any powdered additive are dry blended to form a homogeneous powder blend. The powder blend then is fed to a suitable Pellet Mill at a maximum rate that achieves an acceptable pellet yield. As used herein, the term "pellet yield" refers to the wt. % yield of pellets of nominally about 3 mm diameter. Suitable pellet yields are about 80 wt. % or more, preferably about 90 wt. % or more, more preferably about 95 wt. % or more.

Persons of ordinary skill in the art recognize that a variety of factors affect the temperature of extrusion, including but not necessarily limited to powder composition, rotor speed, feed rate, solvent, type of pellet mill, etc. The "aspect ratio," or the ratio of the diameter to the length of the holes in the die plate, is of particular importance. The smaller the "aspect ratio," the cooler the temperature of extrusion. In the present invention, the temperature of extrusion is maintained below the melting temperature of the stabilizer, preferably at about 100° C. or less, depending upon the stabilizer, most preferably about 70° C. or less. Typically, an aspect ratio of from about 3 to 1 to about 5 to 1 is required to maintain an extrusion temperature of about 70° C. or less. The feed rate of the powder blend preferably is as high as possible while still maintaining this temperature. Using a Kahl Model 14-175 pellet press, the feed rate preferably is at least about 45 lb/hr, more preferably at least about 60 lb/hr, and most preferably about 100 lb/hr or greater.

Examples of pelleting equipment suitable for adaptation and use in the present invention include, but are not necessarily limited to those described in the following U.S. Patents, which are incorporated herein by reference: U.S. Pat. Nos. 4,446,086; 4,670,181; 4,902,210; 5,292,461. A preferred pellet press is a Kahl Model 14-175 Pellet Press equipped with a die plate containing holes of from about 2 to about 6 mm diameter, preferably about 3 mm diameter, which runs at from about 25 lb/hr to about 150 lb/hr. The length at which the strand-like product breaks after leaving the die is determined by a number of factors, including but not necessarily limited to the composition, the temperature, the extrusion pressure, the speed of the revolutions, and the distance between the cutters and the bottom of the die plate. The press operates at a rotor speed of nominally from about 80 to about 250 rpm, preferably from about 80 to about 100 rpm.

The pellets are sieved using an appropriately sized screen to remove fines. Pellets have (a) an average diameter (x) of from about 1 mm to about 10 mm, preferably from about 2 mm to about 6 mm, most preferably about 3 mm, and (b) an average length of from about 1.5x to about 3x, typically from about 2x to about 3x. The pellets generally possess a loose bulk density of from about 400 g/l or greater, with a preferred loose bulk density being from about 500 g/l or greater.

The Mold Release Agent

Substantially any mold release agent or lubricant may be used to make the pellets, including but not necessarily limited to those described in U.S. Pat. No. 5,846,656, incorporated herein by reference. Suitable mold release agents have a melting temperature that is less than the melting temperature of the stabilizer in the additive system. Suitable mold release agents generally have melting temperatures of from about 50° C. to about 100° C., preferably from about 50° C. and about 80° C. Suitable mold release agents include, but are not necessarily limited to fatty acids, glycerol, fatty alcohols, compounds containing fatty acid chains or fatty alcohol chains, and derivatives of the foregoing compounds.

Suitable fatty acids and fatty alcohols comprise a carbon chain of from about 12 to about 22 carbon atoms. Preferred fatty acids include, but are not necessarily limited to stearic acid, palmitic acid, and combinations thereof. Suitable derivatives include, but are not necessarily limited to salts of the fatty acids, amides of fatty acids, fatty alcohols, and fatty acid esters—preferably of mono- and di-esters of glycerol. Examples of suitable derivatives include, but are not necessarily limited to octadecyl 3,5-di-tert-butyl-4-hydroxy hydrocinnamate, glyceryl monostearate, glycerol distearate or oleamide. Most preferred derivatives are powders of fatty acid esters, most preferably mono-esters and di-esters of glycerol with stearic acid, and combinations thereof. A preferred mold release agent for pellets for processing polypropylene is GMS-40, available from American Ingredients Co., Patco Polymer Additives Division of American Ingredients Company, Kansas City, Mo.

The amount of mold release agent in the additive system increases as the amount of the stabilizer in the system decreases. Assuming that the combined total weight of the stabilizer and the mold release agent is 100 wt. %, and the amount of stabilizer is from about 5 wt. % to less than 50 wt. %, the pellets comprise a concentration of the mold release agent or lubricant of from greater than about 50 wt. % to about 95 wt. %, more preferably from about 60 wt. % to about 95 wt. %, and most preferably from about 70 wt. % to about 95 wt. %.

Examples of Components of the Additive System

Substantially any stabilizers may be used in the present invention. Examples of suitable stabilizers include but are not necessarily limited to phosphite antioxidants, sterically hindered phenol antioxidants, hindered amine UV light stabilizers, and combinations thereof. As previously explained, the total quantity of the stabilizer is from about 5 wt. % to less than 50 wt. % of the combined weight of the mold release agent and the stabilizer in the additive system. In a most preferred embodiment, the stabilizer comprises a sterically hindered phenol antioxidant. In this embodiment, the pellets comprise from about 20 wt. % to about 25 wt. % sterically hindered phenol antioxidant, from about 60 wt. % to about 80 wt. % mold release agent, and from about 0 wt. % to about 15 wt. % of a nucleating agent. A preferred nucleating agent for use with polypropylene as the host plastic is sodium benzoate.

Phenolic Stabilizers

Useful sterically hindered phenol antioxidants generally possess a characteristic melting point greater than that of the processing aid, and suitable sterically hindered phenols thus will vary with the melting point of the processing aid. Suitable sterically hindered phenol antioxidants will have melting points of greater than 50° C., preferably about 95° C. or greater, most preferably about 100° C. or greater. Representative sterically hindered phenol antioxidants suitable for use in the present invention include organic materials useful in the stabilization of polymers such as polyethylene and polypropylene, and preferably comprise the formula (I):

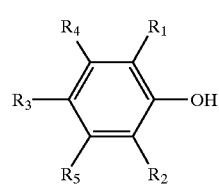

(I)

wherein a $R_1$ and $R_2$ independently are selected from the group consisting of substituents which provide sufficient bulk to prevent the conversion of the —OH to an oxygen radical. In a preferred embodiment, $R_1$ and $R_2$ independently are selected from the group consisting of alkyl groups and alkylthioalkyl groups, and $R_3$, $R_4$ and $R_5$ independently are selected from the group consisting of hydrogen, alkyl groups, aromatic groups, and heterocyclic groups comprising compounds selected from the group consisting of nitrogen, oxygen, phosphorous and sulphur. In a preferred embodiment, $R_1$ and $R_2$ independently are selected from the group consisting of hydrogen, methyl groups, ethyl groups and tert-butyl groups, and $R_4$ and $R_5$ are hydrogens. Even more preferably, $R_1$ and $R_2$ independently are selected from the group consisting of methyl groups and tert-butyl groups.

Numerous types of sterically hindered phenol antioxidants may be used in the present invention, including but not necessarily limited to antioxidants comprising alkylated monophenols, alkylthiomethylphenols, hydroquinones, alkylated hydroquinones, tocopherols, hydroxylated thiodiphenyl ethers, alkylidene bisphenols, O-, N-, and S-benzyl compounds, hydroxybenzylated malonates, hydroxybenzyl aromatics, triazines, benzylphosphonates, acylaminophenols, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, and combinations thereof.

Examples of these classes of sterically hindered phenol antioxidants include, but are not necessarily limited to the following:

Alkylated monophenols: 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methyl-undec-1'-yl)-phenol, 2,4-dimethyl-6-(1'-methylheptadec-1'-yl)phenol, 2,4-dimethyl-6-(1'-methyltridec-1'-yl)phenol, and mixtures thereof;

Alkylthiomethylphenols: 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

Hydroquinones and alkylated hydroquinones: 2,6-di-tert-butyl-4methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

Hydroxylated thiodiphenyl ethers: 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

Alkylidene bisphenols: 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris-(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

O-, N- and S-benzyl compounds: 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide, isooctyl 3,5-di-tert-butyl 4-hydroxybenzylmercapto-cetate.

Hydroxybenzylated malonates: dioctadecyl 2,2-bis3,5-di-tert-butyl 2-hydroxybenzyl)malonate, dioctadecyl 2-(3-tert-butyl -4-hydroxy-5-methylbenzyl)malonate, didodecylmercaptoethyl 2,2-bis (3,5-di-tert-butyl-4-hydroxybenzyl) malonate, di-[4-(1,1,3,3-tetramethylbutyl)phenyl]-2,2-bis(3, 5-di-tert-butyl-4-hydroxybenzyl)malonate.

Hydroxybenzyl aromatic compounds: 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tert-butyl-4-hydroxybenzyl)phenol.

Triazine compounds: 2,4-bisoctylmercapto-6-(3,5-di-tert-butyl-4-hydroxyanilino)-1,3,5-triazine, 2-octylmercapto-4, 6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenyl-propionyl) hexahydro-1,3,5-triazine, 1,3,5-tris(3,5-dicyclohexyl-4-hydroxybenzyl)isocyanurate.

Benzylphosphonates: dimethyl 2,5-di-tert-butyl-4-hydroxybenzylphosphonate; diethyl 3,5-di-tert-butyl-4-hydroxybenzylphosphonate; dioctadecyl-3,5-di-tert-butyl-4-hydroxybenzylphosphonate; dioctadecyl 5-tert-butyl-4-hydroxy-3-methylbenzylphosphonate, calcium salt of monoethyl 3,5-di-tert-butyl-4-hydroxybenzyl phosphonate.

Acylaminophenols: 4-hydroxylauranilide; 4-hydroxystearanilide; octyl N-(3,5-di-tert-butyl-4-hydroxyphenyl)carbamate.

Esters of β-(5-tert-butyl-4-hydroxy-3-methylphenyl) propionic acid, with monohydric or polyhydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

Amides of β-(3,5-di-tert-butyl-4-hydroxyphenyl) propionic acid: N,N'-bis(3,5-di-tert-butyl-4-hydroxyphenylpropionyl)hexamethylenediamine; N,N'-bis (3,5-di-tert-butyl -4-hydroxyphenylpropionyl) trimethylenediamine; N,N'-bis(3,5-di-tert-butyl-4-hydroxyphenylpropionyl)hydrazine.

Exemplary sterically hindered phenol antioxidant compounds include:

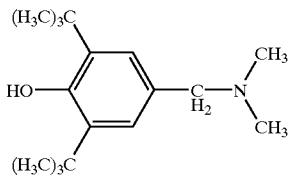

(I)

2,6-di-t-butyl-N,N-dimethylamino-p-cresol, which has a melting point of 94° C. (201° F.) and is a product of Albemarle Corporation of Richmond, Va., and available under the trade name Ethanox® 703 antioxidant;

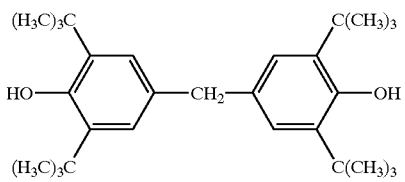

(II)

4,4'-methylenebis(2,6-di-t-butylphenol), which has a melting point of 154° C. (309° F.) and is a product of Albemarle Corporation of Richmond, Va., and available under the trade name Ethanox® 702 antioxidant;

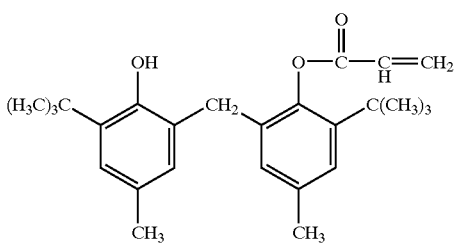

(III)

2-tert-butyl-6-(3-tert-butyl-2-hydroxy-5-methylbenzyl)-4-methylphenyl acrylate, which has a melting point of 128–132° C. (262–270° F.) and is commercially available from Ciba Specialty Chemicals under the trade name IRGANOX 3052;

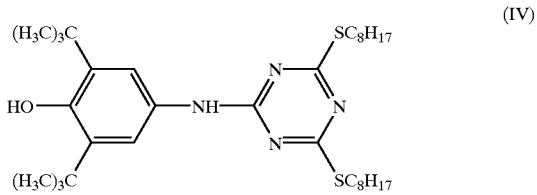

(IV)

2,4-bis(n-octylthio)-6-(4-hydroxy-3,5-di-t-butylanilino)-1,3,5-triazine, which has a melting point of 390–407° C. (199–208.5° F.) and is a product of Ciba Special Chemicals of Tarrytown, N.Y., and available under the trade name IRGANOX 565;

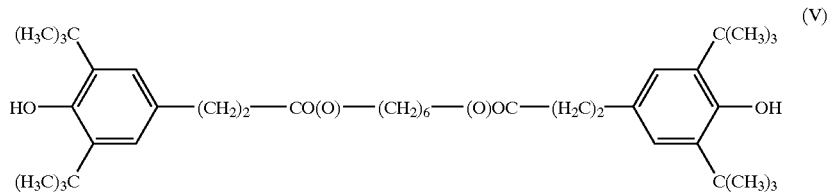

(V)

1,6-hexanediyl 3,5-bis(1,1-dimethylethyl)-4-hydroxyphenylpropanoate, which has a melting point of 93–108° C. (199–227° F.) and is commercially available from Ciba Specialty Chemicals under the trade name IRGANOX 259;

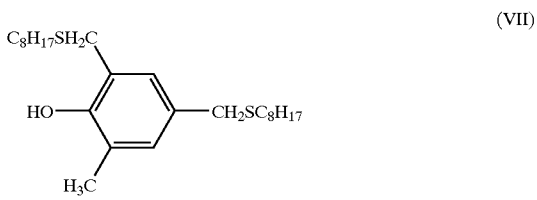

(VI)

1,2-ethanediylbis(oxy-2,1-ethanediyl) 3-(1,1-dimethylethyl)-4-hydroxy-5-methyl-phenyl propanoate, which has a melting point of about 76–79° C. (168–175° F.) and is commercially available from Ciba Specialty Chemicals under the trade name IRGANOX 245;

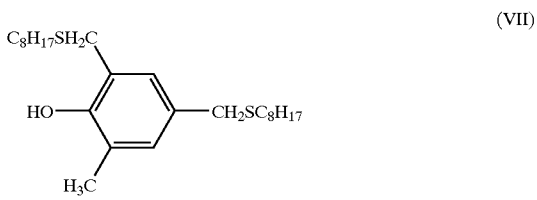

(VII)

2-methyl-4,6-di[(octylthio)methyl]phenol, which is a liquid at ambient temperatures, and is commercially available from Ciba Specialty Chemicals under the trade name IRGA-NOX 1520;

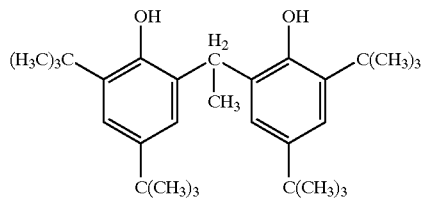
(VIII)

2,2'-ethylidenebis(4,6-di-tert-butylphenol), which has a melting point of 161–163° C. (321–326° F.), and is commercially available from Ciba Specialty Chemicals under the trade name IRGANOX 129;

Preferred sterically hindered phenol antioxidants include:

A. Octadecyl 3,5-di-t-butyl-4-hydroxyhydrocinnamate having the structure:

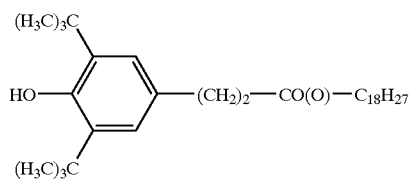
(IX)

which has a melting point of 50–55° C. (122–131° F.) and is a product of Ciba Specialty Chemicals of Tarrytown, N.Y., and available under the trade name Irganox 1076;

B. Tetrakis [methylene(3,5-di-t-butyl-4-hydroxylhydrocinnamate)]methane having the structure:

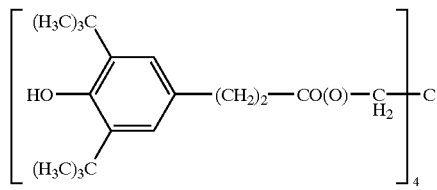
(X)

which has a melting point of 110–125° C. (230–257° F.) and is a product of Great Lakes Chemical Corporation of West Lafayette, Ind., or Ciba Special Chemicals of Tarrytown, N.Y., and available under the trade name ANOX 20 or IRGANOX 1010, respectively;

C. 1,3,5-tris-(3,5-di-t-butyl-4-hydroxybenzyl) isocyanurate having the structure:

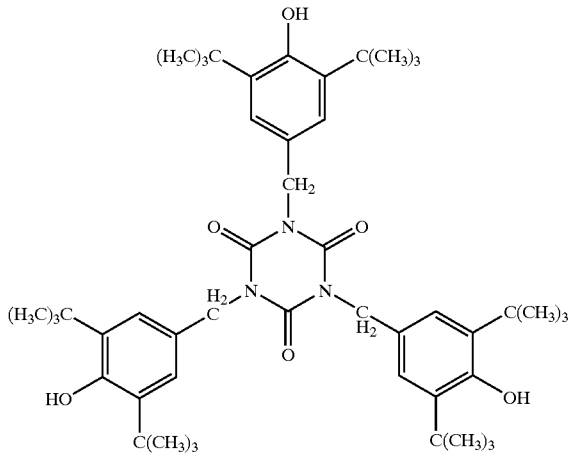
(XI)

which has a melting point of 218–224° C. (424.5–433.5° F.) and is a product of Albemarle Corporation of Richmond, Va., and available under the trade name Ethanox® 314 antioxidant or Ciba Specialty Chemicals of Tarrytown, N.Y., and available under the trade name Irganox 3114;

D. 1,3,5-tris-(4-t-butyl-3-hydroxy-2,6-dimethylbenzyl)-1,3,5-triazine-2,4,6-(1H,3H,5)-trione having the structure:

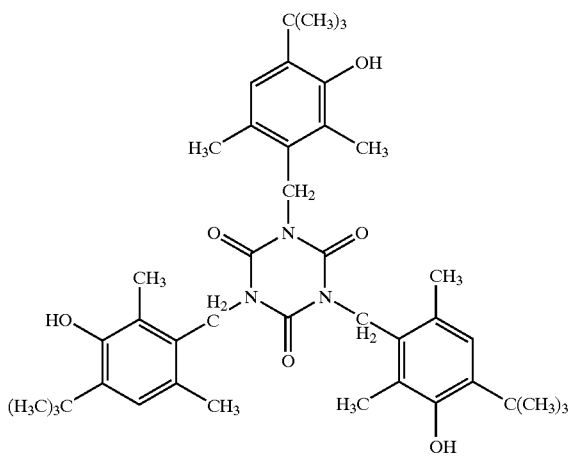
(XII)

which has a melting point of 155–159° C. (311–318° F.) and is a product of Cytec of Stamford, Conn., and available under the trade name CYANOX 1790;

E. Thiodiethylenebis-(3,5-di-t-butyl-4-hydroxy) hydrocinnamate having the structure:

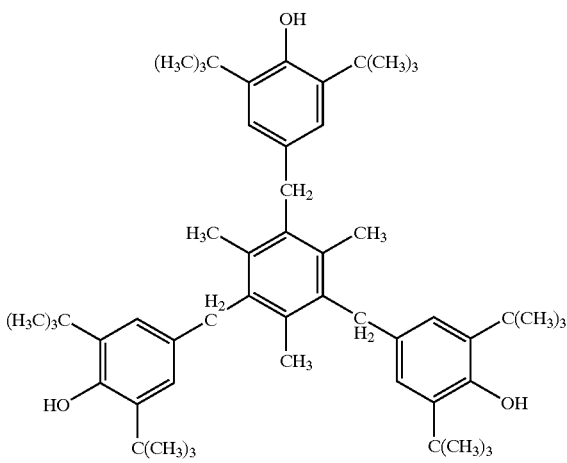

(XIII)

which is a product of Ciba Speciality Chemicals of Tarrytown, N.Y., which has a melting point of about 63° C. (145° F.), and is commercially available under the trade name IRGANOX 1035; and, F. 1,3,5-trimethyl-2,4,6-tris-(3,5-di-tert-butyl-4-hydroxybenzyl)benzene having the structure:

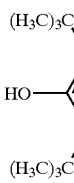

(XIV)

which has a melting point of 244° C. (471° F.) and is a product of Albemarle Corporation of Richmond, Va., and available under the trademark Ethanox® 330 antioxidant. Of these preferred sterically hindered phenol antioxidants, 1,3,5-trimethyl-2,4,6-tris(3,5-di-tert-butyl-4-hydroxybenzyl)benzene and 1,3,5-tris-(3,5-di-t-butyl-4-hydroxybenzyl)isocyanurate are most preferred.

Secondary Phosphite Antioxidants

In addition to the sterically hindered phenol antioxidant of the present invention, the stabilizer pellets also may comprise a "secondary phosphite antioxidant," so designated because the phosphite antioxidant is always included with at least a "first" sterically hindered phenol antioxidant. Suitable secondary phosphite antioxidants are known in the art, and the proper type and amount of secondary phosphite antioxidant can be determined without undue experimentation by those of ordinary skill in the art. A suitable amount of secondary phosphite antioxidant will vary with the intended use of the additive system, typically from about 0 weight percent to about 80 weight percent, preferably from about 3 weight percent to about 70 weight percent. The weight ratio between the sterically hindered phenol antioxidant and the secondary phosphite antioxidant, where used, preferably ranges from about 20:1 to about 1:10, with a more preferred range of from about 10:1 to about 1:5, and a most preferred range of from about 2:1 to about 1:4.

Exemplary secondary phosphite antioxidants include, without limitation, such compounds as phosphites, phosphonites, fluoro-phosphonites and similar phosphite antioxidant compounds useful in stabilizing plastics. Examples include, but are not necessarily limited to organic phosphites and phosphonites, particularly in stabilizing polyolefin polymer compositions. These include aromatic phosphites and phosphonites, for example triphenyl phosphite, diphenyl alkyl phosphites, phenyl dialkyl phosphites, tris(diphenyl alkyl phosphite)amines, tris(nonylphenyl) phosphite, trilauryl phosphite, trioctadecyl phosphite, distearyl pentaerythrityl diphosphite, tris(2,4-di-tert-butylphenyl)phosphite, distearyl pentaerythrityl diphosphite, bis(2,4-di-tert-butylphenyl)pentaerythrityl diphosphite, tristearyl sorbityl triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5,5] undecane and 2,2'-ethylidenebis(4,6-di-tert-butylphenyl) fluorophosphite.

Particularly useful phosphites include:

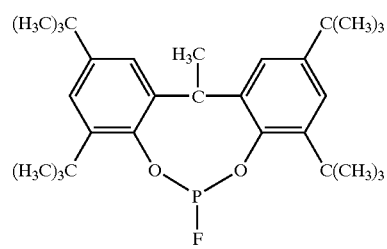

(XV)

2,2'-ethylidenebis-(4,6-di-t-butylphenyl)-fluorophosphonite, which has a melting point of 200° C. (393° F.) and is a product of Albemarle Corporation of Richmond, Va., and available under the trademark Ethanox® 398 antioxidant;

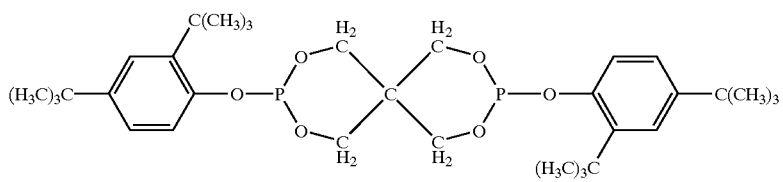

(XVI)

bis(2,4-di-t-butylphenyl)pentaerythritol-di-phosphite, which has a melting point of (160–175° C.) 320–347° F. and is a product of GE Specialty Chemicals of Parkersburg, W. Va., and available under the trade name ULTRANOX 626;

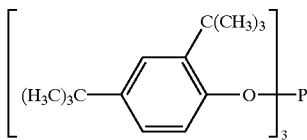
(XVI)

tris(2,4-di-tert-butylphenyl)phosphite, which has a melting point of 183° C.–188° C. (360.5–370.5° F.) and is a product of Ciba Special Chemicals of Tarrytown, N.Y., and available under the trade name IRGAFOS 168;

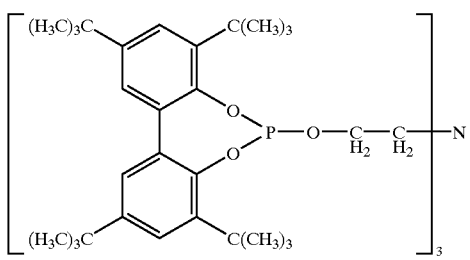
(XX)

2,2',2"-nitrilo[triethyl-tris[3,3',5,5'-tetra-t-butyl-1,1'-biphenyl-2,2'-diyl]phosphite, which has a melting point of 200–205° C. (392–401° F.) and is a product of Ciba Special Chemicals of Tarrytown, N.Y., and available under the trade name IRGAFOS 12;

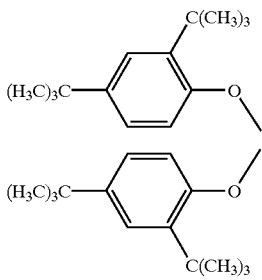 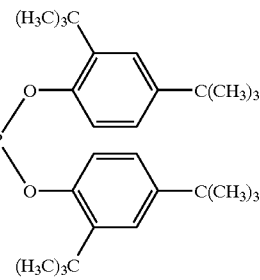

tetrakis (2,4-di-t-butylphenyl)-4,4-biphenylene-diphosphonite, which has a melting point of 85–95° C. (185–203° F.) and is a product of Clariant of Frankfurt, Germany, and available under the trade name SANDOSTAB P-EPQ.

bis[2,4-dicumylphenyl]pentaerythritol diphosphite, which has a melting point of 225° C. (437° F.) or greater and is a product of Dover Chemical Corp., Dover Ohio, a subsidiary of ICC Industries, available under the name DOVERPHOS S-9228.

Other Optional Additives

The additive system of the present invention optionally may include one or more additive(s) selected from the group consisting of acid neutralizers, antistatics, antiblocking agents, flame proofing agents, thioesters, pigments, UV absorbers, light stabilizers, metal deactivators, peroxide scavengers, polyamide stabilizers, basic costabilizers, nucleating agents, fillers, benzofuranones and indolinones, plasticizers, emulsifiers, optical brighteners, and/or blowing agents.

UV and light stabilizers

Suitable UV absorbers and light stabilizers include, but are not necessarily limited to 2-(2'-hydroxyphenyl) benzotriazoles, for example 2-(2'-hydroxy-5'-methylphenyl) benzotriazole, 2-(3',5'-di-tert-butyl-2'-hydroxyphenyl) benzotriazole, 2-(5'-tert-butyl-2'-hydroxyphenyl) benzotriazole, 2-(2'-hydroxy-5'-(1,1,3,3-tetramethylbutyl) phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl) phenyl)-5-chlorobenzotriazole, 2-(3'-tert-butyl-5'[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole 2-(3'-dodecyl-2'-hydroxy-5'-

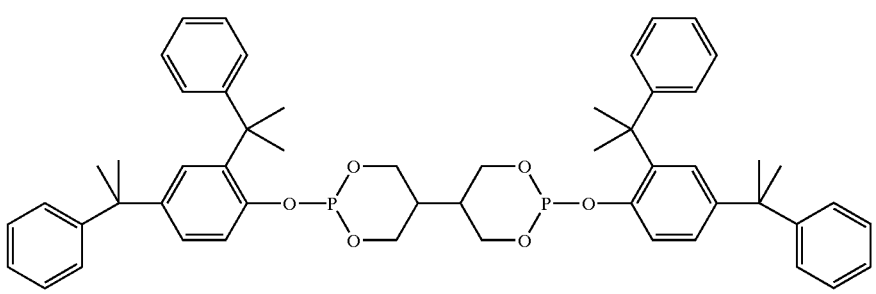
(XXII)

methylphenyl)benzotriazole, and 2-(3'-tert-butyl-2'-hydroxy -5'-(2-isooctyloxycarbonylethyl)phenylbenzotriazole, 2,2'-methylenebis[4-(1,1,3,3-tetramethylbutyl)-6-benzotriazol-2-ylphenol]; transesterification product of 2-[3'-tert-butyl-5'-(2-methoxycarbonylethyl)-2'-hydroxyphenyl]benzotriazole with polyethylene glycol 300; [R—CH$_2$CH$_2$—COO(CH$_2$)$_3$]$_2$ where R is 3'-tert-butyl-4'-hydroxy-5'-2H-benzotriazol-2ylphenyl.

Hydroxybenzophenones, including but not necessarily limited to the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives. Esters of unsubstituted or substituted benzoic acids, for example 4-tert-butylphenyl salicylate, phenyl salicylate, octylphenyl salicylate. dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl -4-hydroxybenzoate. Acrylates, including but not necessarily limited to ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

Nickel compounds, including but not necessarily limited to nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzyl phosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

Oxalamides, including but not necessarily limited to 4,4'-dioctyloxyoxanilide, 2,2'diethoxyoxanilide, 2,2'-dioctyloxy-5,5'-di-tert-butyloxanilide, 2,2'-didodecyloxy-5, 5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides. 2-(2-Hydroxyphenyl)-1,3,5-triazines, including but not necessarily limited to 2,4,6-tris (2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4, 6-bis(2,4-dimethylphenyl)-1,3,5-triazine, 2,4-bis(2-hydroxy-4-propyloxyphenyl)-6-(2,4-dimethylphenyl)-1,3, 5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy) phenyl]-4,6-bis(2,4-dimethylphenyl)-1,3,5-triazine, 2-[2-hydroxy-4-(2-hydroxy-3-octyloxypropoxy)phenyl]-4,6-bis (2,4-dimethylphenyl)-1,3,5-triazine.

Acid Neutralizers

A preferred additive comprises acid neutralizers. Suitable acid neutralizers include, but are not necessarily limited to metal oxides, metal carbonates, hydrotalcites, and similar compounds useful in achieving acid neutralization in an additive system. The acid neutralizers may be naturally occurring minerals or synthetic compounds. Where used, an acid neutralizer typically comprises from about 0 weight percent to about 80 weight percent, preferably from about 20 weight percent to about 60 weight percent of the additive system. A preferred acid neutralizer comprises a hydrotalcite.

Suitable hydrotalcites for the present invention include those represented by the general formula:

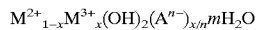

$$M^{2+}{}_{1-x}M^{3+}{}_x(OH)_2(A^{n-})_{x/n} m H_2O$$

wherein $M^{2+}$ is selected from the group consisting of $Mg^{2+}$, $Ca^{2+}$, $Sr^{2+}$, $Ba^{2+}$, $Zn^{2+}$, $Cd^{2+}$, $Pb^{2+}$, $Sn^{2+}$, or $Ni^{2+}$; $M^{3+}=Al^{3+}$, $B^{3+}$ or $Bi^{3+}$; $A^{n-}$ is an anion having a valence of n, preferably selected from the group consisting of $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $(COO^-)_2$, $(CHOH)_4$ $CH_2OHCOO^-$, $C_2H_4(COO)_2^{2-}$, $(CH_2COO_2^{2-}$, $CH_3CHOHCO^-$, $SiO_3^{2-}$, $SiO_4^{4-}$, $Fe(CN)_6^{3-}$, $Fe(CN)_6^{4-}$ or $HPO_4^{2-}$; n is from about 1 to about 4; x is from about 0 to about 0.5; and m is from about 0 to about 2. Preferably, $M^{2+}$ is $Mg^{2+}$ or a solid solution of Mg and Zn, $M^{3+}$, is $Al^{3+}$; $A^{n-}$ is $CO_3^{2-}$, x is a number from 0 to 0.5, and m is a number from 0 to 2.

Exemplary hydrotalcites include, but are not necessarily limited to: $Al_2O_3 6MgO.CO_2 12H_2O$; $Mg_{4.5}Al_2(OH)_{13}$. $CO_3.3,5H_2O$; $4MgO.Al_2O_3 CO_2.9H_2O$; $4MgO.Al_2O_3$. $CO_2 6H_2O$; $ZnO.3MgO.Al_2O_3.CO_2.8-9H_2O$ and $ZnO$. $3MgO.Al_2O_3.CO_2.5-6H2O$. The amount of hydrotalcite incorporated into the pellets varies according to the intended use of the pellets, and preferably is from about 0 weight percent to about 50 weight percent, more preferably from about 3 weight percent to about 40 weight percent hydrotalcite. Hydrotalcites are commercially available from Kyowa Chemical Company of Japan under the trademark DHT-4A, DHT-4C and DHT-4V.

Preferred metal oxides include divalent metal oxides, particularly Group II metal oxides, most preferably zinc oxide and magnesium oxide. The amount of metal oxide used in the pellets will vary with the intended use of the pellets, preferably from about 0 weight percent to about 90 weight percent, more preferably from about 5 weight percent to about 60 weight percent, and most preferably from about 40 weight percent to about 50 weight percent.

Preferred metal carbonates include, but are not necessarily limited to divalent metal carbonates, preferably Group II metal oxides, most preferably calcium carbonate. The amount of metal carbonate used in the pellets will vary with the intended use of the pellets, preferably from about 0 weight percent to about 90 weight percent, more preferably from about 5 weight percent to about 60 weight percent.

Other suitable additives for use in the additive system include, but are not necessarily limited to Group II fatty acid metal salts (metal soaps) and similar compounds, such as magnesium, tin, zinc or preferably calcium salts having, for example, aliphatic saturated $C_2$–$C_{22}$ carboxylates, aliphatic olefinic $C_3$–$C_{22}$ carboxylates, aliphatic $C_2$–$C_{22}$ carboxylates substituted by at least one OH group, cyclic or bicyclic $C_5$–$C_{22}$ carboxylates, aromatic $C_7$–$C_{22}$ carboxylates, aromatic $C_7$–$C_{22}$ carboxylates substituted by at least one OH group, $C_1$–$C_{16}$ alkyl-substituted phenylcarboxylates and phenyl-$C_1$–$C_{16}$ alkylcarboxylates, preferably stearates, laurates and behenates. Other preferred metal soaps include, but are not necessarily limited to calcium stearate, zinc stearate, and magnesium stearate. The amount of metal soap used in the pellets will vary with the intended use of the pellets, preferably from about 0 weight percent to about 90 weight percent, and more preferably from about 5 weight percent to about 60 weight percent.

Thioesters

Preferred thioesters include, but are not necessarily limited to esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis(β-dodecylmercapto)propionate or ethylene glycol bismercaptoacetate.

Metal Deactivators

Metal deactivators, including but not necessarily limited to N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalodihydrazide, oxanilide, isophthalodihydrazide, sebacobisphenyl hydrazide, N,N'-diacetyladipodihydrazide, N,N'-bissalicyloyloxalodihydrazide and N,N'-bissalicyloylthiopropionodihydrazide.

Peroxide Scavengers

Peroxide scavengers, including but not necessarily limited to esters of β-thiodipropionic acid, for example the lauryl, stearyl, myristyl and tridecyl esters, mercaptobenzimidazole, the zinc salt of 2-mercaptobenzimidazole, zinc dibutyldithiocarbamate, dioctadecyl disulfide and pentaerythrityl tetrakis(β-dodecylmercapto)propionate.

Polyamide Stabilizers

Polyamide stabilizers, including but not necessarily limited to copper salts in combination with iodides and/or phosphorus compounds and salts of divalent manganese.

Basic Costabilizers

Basic costabilizers, including but not necessarily limited to melamine, polyvinylpyrrolidone, dicyandiamide, triallyl cyanurate, urea derivatives, hydrazine derivatives, amines, polyamides, polyurethanes, alkali and alkaline earth metal salts of higher fatty acids, for example zinc stearate, magnesium behenate, magnesium stearate, sodium ricinoleate, potassium palmitate, antimony pyrocatecholate and tin pyrocatecholate.

Nucleating Agents

Nucleating agents, including but not necessarily limited to sodium salts of adipic acid, diphenylacetic acid, and benzoic acid, preferably sodium benzoate (for polypropylene). Clarifiers, including but not necessarily limited to 3,4-dimethylbenzylidine sorbitol, which is a product of Milliken Chemical of Inman, S.C., and is available under the trade name Millad 3988.

Fillers, etc.

Fillers and reinforcing agents, including but not necessarily limited to calcium carbonate, silicates, glass fibres, asbestos, talc, kaolin, mica, barium sulfate, metal oxides and hydroxides, carbon black and graphite.

Benzofuranones and Indolinones

Benzofuranones and indolinones, including but not necessarily limited to 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis [5,7-di-tert-butyl-3-(4-[2-hydroxy ethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one and 3-(3,5-dimethyl-4-pivaloyloxyphenyl)-5,7-di-tert-butylbenzofuran-2-one.

Polymers for Treatment with the Pelleted System

The pellets according to the present invention are suitable for the stabilization of organic polymers or plastics against thermal, oxidative or photoinduced degradation. Examples of such polymers include, but are not necessarily limited to polymers of monoolefins and diolefins, including, but not necessarily limited to polypropylene, polyisobutylene, polybut-1-ene, poly-4-methylpent-1-ene, polyisoprene or polybutadiene, as well as polymers of cycloolefins, for instance of cyclopentene or norbornene; furthermore polyethylene (which can be crosslinked), for example high density polyethylene (HDPE), low density polyethylene (LDPE), linear low density polyethylene (LLDPE) and branched low density polyethylene (BLDPE). The pellets preferably are used to process polyolefins, i.e., polymers of monoolefins, preferably polypropylene. Polypropylene may be prepared by various processes, including: by means of free radicals (usually at high pressure and high temperature) or by means of a catalyst, where the catalyst usually contains one or more metals from group IVb, Vb, VIb or VIII. These metals usually contain one or more ligands, such as oxides, halides, alkoxides, esters, ethers, amines, alkyls, alkenyls and/or aryls, which can be either π or σ-coordinated. These metal complexes can be free or fixed to supports, for example to activated magnesium chloride, titanium(III) chloride, aluminum oxide or silicon oxide. These catalysts can be soluble or insoluble in the polymerization medium. The catalysts can be active as such in the polymerization or further activators can be used, for example metal alkyls, metal hydrides, metal alkyl halides, metal alkyl oxides or metal alkyl oxanes, where the metals are elements from groups Ia, IIa and/or IIIa. The activators can have been modified, for example, by means of further ester, ether, amine or silyl ether groups. These catalyst systems are usually known as Ziegler(-Natta), TNZ, metallocene or single site catalysts (SSC).

The pellets of the present invention may further be used to process mixtures of the previously identified polymers, for example mixtures of polypropylene with polyisobutylene, polypropylene with polyethylene (for example PP/HDPE, PP/LDPE) and mixtures of different types of polyethylene (for example LDPE/HDPE). Additionally, the pellets may be used with copolymers of monoolefins and diolefins with each other or with other vinyl monomers, for example ethylene-propylene copolymers, linear low density polyethylene (LLDPE) and its mixtures with low density polyethylene (LDPE), propylene-but-1-ene, propylene-isobutylene, ethylene-but-1-ene, ethylene-hexene, ethylene-methylpentene, ethylene-heptene, ethylene-octene, propylene-butadiene, isobutylene-isoprene, ethylene-alkyl acrylate, ethylene-alkyl methacrylate, ethylene-vinyl acetate copolymers or copolymers thereof with carbon monoxide or ethylene-acrylic acid copolymers and their salts (ionomers) and terpolymers of ethylene with propylene and a diene, such as hexadiene, dicyclopentadiene or ethylidenenorbornene; as well as mixtures of such copolymers and their mixtures with polymers previously identified, for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and polyalkylene-carbon monoxide copolymers with an alternating or random structure, and mixtures thereof with other polymers, for example polyamides. Other polymer systems such as hydrocarbon resins (for example $C_5$–$C_9$), including hydrogenated modifications thereof (for example tackifing resins) and mixtures of polyalkylenes and starch, polystyrene, poly(p-methylstyrene), poly(α-methylstyrene), and copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-maleic anhydride, styrene-acrylonitrile-methyl acrylate; high impact strength mixtures of styrene copolymers and another polymer, for example a polyacrylate, a diene polymer or an ethylene-propylene-diene terpolymer; and block copolymers of styrene, for example styrene-butadiene-styrene, styrene-isoprenestyrene, styrene-ethylene/butylene-styrene or styrene-ethylene/propylene-styrene may be processed with the pellets of the present invention.

Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers of the previously identified styrene or α-methylstyrene with dienes or acrylic derivatives, for instance the copolymer mixtures known as ABS, MBS, ASA or AES polymers may be processed.

Other processed polymers include halogen-containing polymers, such as polychloroprene, chlorinated rubber, chlorinated or chlorosulfonated polyethylene, copolymers of ethylene and chlorinated ethylene, epichlorohydrin homo- and copolymers, in particular polymers from halogen-containing vinyl compounds, for example polyvinyl chloride, polyvinylidene chloride, polyvinyl fluoride, polyvinylidene fluoride, as well as copolymers thereof, for example vinyl chloride-vinylidene chloride, vinyl chloride-vinyl acetate or vinylidene chloride-vinyl acetate. Polymers derived from α,β-unsaturated acids and derivatives thereof, such as polyacrylates and polymethacrylates, polymethacrylates, polyacrylamides and polyacrylonitriles which have been impact modified by means of butyl acrylate. Copolymers of the monomers from α,β-unsaturated acids with each other or with other unsaturated monomers, for instance acrylonitrile-butadiene, acrylonitrile-alkyl acrylate, acrylonitrile-alkoxyalkyl acrylate or acrylonitrile-vinyl halide copolymers or acrylonitrile-alkyl methacrylate-butadiene terpolymers. Polymers derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; and their copolymers with olefins. Homopolymers and copolymers of cyclic ethers, such as polyalkylene glycols, polyethylene oxide, polypropylene oxide or copolymers thereof with bisglycidyl ethers. Polyacetals, such as polyoxymethylene and those polyoxymethylenes which contain comonomers, for example ethylene oxide; polyacetals modified with thermoplastic polyurethanes, acrylates or MBS. Polyphenylene oxides and sulfides, and mixtures thereof with styrene polymers or polyamides. Polyurethanes derived from polyethers, polyesters or polybutadienes with terminal hydroxyl groups on the one hand and aliphatic or aromatic polyisocyanates on the other, and precursors thereof. Polyamides and copolyamides derived from diamines and dicarboxylic acids and/or from aminocarboxylic acids or the corresponding lactams, such as nylon 4, nylon 6, nylon 6/6, 6/10, 6/9, 6/12, 4/6, and 12/12, nylon 11, nylon 12, aromatic polyamides obtained from m-xylene, diamine and adipic acid; polyamides prepared from hexamethylenediamine and isophthalic and/or terephthalic acid and optionally an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, for instance with polyethylene glycol, polypropylene glycol or polytetramethylene glycol. Further, EPDM- or ABS-modified polyamides or copolyamides; and polyamides condensed during processing ("RIM polyamide systems"). Polyureas, polyimides, polyamide-imides and polybenzimidazoles. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate and polyhydroxybenzoates as well as block polyether-esters derived from polyethers having hydroxyl end groups; also polycarbonate- or MBS-modified polyesters. Polycarbonates, polyester carbonates, polysulfones, polyether sulfones and polyether ketones. Crosslinked polymers derived from aldehydes on the one hand and phenols, urea or melamine on the other, such as phenol-formaldehyde resins, urea-formaldehyde resins and melamine-formaldehyde resins. Drying and non-drying alkyd resins. Unsaturated polyester resins derived from copolyesters of saturated and unsaturated dicarboxylic acids with polyhydric alcohols, and vinyl compounds as crosslinking agents, and also halogen-containing modifications thereof of low inflammability. Crosslinkable acrylic resins, derived from substituted acrylic esters, for example epoxy acrylates, urethane acrylates or polyester acrylates. Alkyd resins, polyester resins or acrylate resins crosslinked with melamine resins, urea resins, polyisocyanates or epoxy resins. Crosslinked epoxy resins derived from polyepoxides, for example from bisglycidyl ethers or from cycloaliphatic diepoxides. Natural polymers, such as cellulose, natural rubber, gelatin and derivatives thereof which are chemically modified in a polymer-homologous manner, such as cellulose acetates, cellulose propionates and cellulose butyrates, or cellulose ethers, such as methylcellulose; and colophony resins and derivatives. Mixtures (polyblends) of polymers as mentioned above, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO. Natural and synthetic organic substances which are pure monomeric compounds or mixtures thereof, for example mineral oils, animal or vegetable fats, oils and waxes, or oils, waxes and fats based on synthetic esters (for example phthalates, adipates, phosphates or trimellitates), and blends of synthetic esters with mineral oils in any desired weight ratios, as used, for example, as spinning preparations, and aqueous emulsions thereof. Aqueous emulsions of natural or synthetic rubbers, for example natural rubber latex or latexes of carboxylated styrene-butadiene copolymers.

Hosokawa Flowability

For ease of addition to the host plastic, the pellets preferably have a high "Hosokawa Flowability" rating. Hosokawa Flowability is a powder flowability rating based on a 0–100 rating scale, with 100 representing ideally perfect powder flow and 0 representing extremely poor powder flow. Hosokawa Flowability of the pellets made according to the present invention preferably is about 70 or greater, preferably about 80 or greater.

Use of the Pellets

The pellets are added to the organic polymers to be stabilized in an amount effective to stabilize the particular polymer. Typically, this requires from about 0.01 to 10%, more preferably from about 0.0 to about 5%, based on the total weight of the organic polymer to be stabilized. The pellets according to the invention and any further additives can be incorporated into the organic polymer by known methods, for example, before or during molding or by applying the dissolved or dispersed pellets to the polymer, if necessary with subsequent evaporation of the solvent. The pellets also can be used for the production of so-called masterbatches. The polymer stabilized in this way can be converted into a wide variety of forms in a conventional manner, for example into films, fibers, tapes, molding compositions or profiles.

Manufacture and testing of the stabilizer pellets of the present invention may be accomplished as described in the following examples and procedures.

EXAMPLE 1

Pellet of Ethanox 330/Sodium Benzoate/GMS-40 Additive Blend 2.22 lb of sodium benzoate powder (Mallinckrodt −325 mesh), 4.44 lb of Ethanox 330 powder, and 13.34 lb of GMS-40 PATIONIC® 1042K mono/diglycerides (obtained from the Patco Polymer Additives Division of American Ingredients Co.) were combined in a tumble blender and tumbled for 3 minutes to obtain a homogeneous powder blend. The powder blend was fed, at a rate of about 50 to 54 lb/hr, to a Kahl Model-14-175 Pellet Mill, which was operated at 100 rpm rotor speed and was equipped with a die plate having holes of 3 mm diameter and 12 mm pressway length. During the pelleting operation, the die plate temperature was in the range of 44° C. to 48° C. The output product from the pellet mill was dry sieved with a US Standard No. 12 screen to remove the fine powder (−12 mesh material) from the formed pellets. Approximately 94.5% by weight of the output product consisted of cylindrical pellets of nominally 3 mm diameter. The resulting pellets exhibited good abrasion resistance and therefore, would handle well in powder metering and conveying equipment.

EXAMPLE 2

The procedures of Example 1 essentially were repeated, except the feeding rate of the powder blend to the pellet mill was increased to about 100 lb/hr. During the pelleting operation, the temperature of the die plate ranged from about 48° C. to about 49° C. The pellets obtained represented about 95.3% by weight of the pellet mill output produced (the balance was −12 mesh fines), had good abrasion resistance properties, and therefore would handle well in powder metering and conveying equipment.

EXAMPLE 3

Pellet of Ethanox 330/Calcium Stearate/GMS-40 Additive Blend 2.98 lb of calcium stearate powder (Hydense 5862, obtained from Mallickrodt), 4.26 lb of Ethanox 330 powder, and 12.76 lb of GMS-40 powder were combined and tumble blended for 3 minutes to obtain a homogenous powder blend. This powder blend was processed with the pellet mill under essentially the same conditions/procedures of Example 1, except the powder feed rate to the pellet mill was bout 47 lb/hr and the die temperature ranged from about 42° C. to about 47° C. The output from the pellet mill consisted of 91.5.% by weight cylindrical pellets of nominally 3 mm diameter, the balance being −12 mesh fines. The pellets thus obtained exhibited good abrasion resistance and therefore would handle well in powder metering and conveying equipment.

EXAMPLE 4

The procedures of Example 3 were essentially repeated except the feed rate of powder to the pellet mill was about 69 lb/hr and the die temperature ranged from about 48° C. to about 49° C. The output from the pellet mill consisted of about 93.7% by weight cylindrical pellets of nominally 3 mm diameter, and the balance of the output was −12 mesh fines. The pellets thus obtained exhibited good abrasion resistance and therefore would handle well in powder metering and conveying equipment.

EXAMPLE 5

Hosokawa Flowability of Antioxidant Blend Pellets

Hosokawa Flowability of the following blends was tested using known procedures, namely:
1) Measuring five standard powder properties, namely aerated bulk density, packed bulk density, angle of repose, angle of spatula, and particle uniformity (from sieve size analyses);
2) From the aerated and packed bulk densities, calculating a factor called the compressibility;
3) From correlation charts, assigning an index rating (0–25 scale) to the angle of repose, the angle of spatula, the particle uniformity, and the compressibility; and
4) Summing the four index ratings of Step 3 to arrive at the numerical value of the Hosokawa Flowability.

The following were the results:

| Blend of Example | Hosokawa Flowability | Aerated Bulk Density/g/ml | Packed Bulk Density, g/ml |
|---|---|---|---|
| 1 | 86 | 0.576 | 0.608 |
| 2 | 76 | 0.571 | 0.611 |
| 3 | 85 | 0.544 | 0.606 |
| 4 | 76 | 0.552 | 0.611 |

The specific examples herein disclosed are to be considered as being primarily illustrative. Various changes beyond those described will occur to those skilled in the art and such changes are to be understood as forming a part of this invention as they fall within the spirit and scope of the appended claims.

What is claimed is:

1. A stabilizer additive system for polymers comprising pellets comprising:
    an amount of at least one stabilizer having a first melting temperature, said stabilizer being selected from the group consisting of an antioxidant, a UV light stabilizer, and a combination thereof; and
    a quantity of at least one processing aid that is a mold release agent or lubricant, or both, said processing aid having a second melting temperature lower than said first melting temperature;
    wherein said amount of said stabilizer and said quantity of said processing aid comprise a combined total weight, said amount of said stabilizer being less than 50 wt % of said combined total weight.

2. The stabilizer additive system of claim 1 wherein said amount of said stabilizer is at least about 5 wt. % of said combined total weight.

3. The stabilizer additive system of claim 1 wherein said amount of said stabilizer is from about 5 wt. % to about 40 wt. % of said combined total weight.

4. The stabilizer additive system of claim 1 wherein said amount of said stabilizer is from about 5 wt. % to about 10 wt. % of said combined total weight.

5. The stabilizer additive system claim 1 wherein said combined total weight comprises a weight ratio of said mold release agent to said stabilizer of from greater than about 1:1 to about 70:1.

6. The stabilizer additive system of claim 2 wherein said combined total weight comprises a weight ratio of said mold release agent to said stabilizer of from greater than about 1:1 to about 10:1.

7. The stabilizer additive system of claim 1 wherein said combined total weight comprises a weight ratio of said mold release agent to said stabilizer of from greater than about 1:1 to about 10:1.

8. The stabilizer additive system of claim 1 comprising
sufficient coherence to provide abrasion resistance during handling but insufficient coherence to interfere with dispersibility of said additive system in said polymers; and
a Hosakawa flowability of about 70 or more;
a loose bulk density of from about 400 g/l or greater; and,
an average diameter (x) of from about 2 millimeters to about 6 millimeters, and an average length of from about 1.5x to about 3x.

9. The stabilizer additive system of claim 2 comprising
sufficient coherence to provide abrasion resistance during handling but insufficient coherence to interfere with dispersibility of said additive system in said polymers; and
a Hosakawa flowability of about 70 or more;
a loose bulk density of from about 400 g/l or greater; and,
an average diameter (x) of from about 2 millimeters to about 6 millimeters, and an average length of from about 1.5x to about 3x.

10. The stabilizer additive system of claim 7 comprising
sufficient coherence to provide abrasion resistance during handling but insufficient coherence to interfere with dispersibility of said additive system in said polymers; and
a Hosakawa flowability of about 70 or more;
a loose bulk density of from about 400 g/l or greater; and,
an average diameter (x) of from about 2 millimeters to about 6 millimeters, and an average length of from about 1.5x to about 3x.

11. The stabilizer additive systems of claim 1 wherein said at least one stabilizer comprises at least one sterically hindered phenol antioxidant.

12. The stabilizer additive systems of claim 2 wherein said at least one stabilizer comprises at least one sterically hindered phenol antioxidant.

13. The stabilizer additive systems of claim 5 wherein said at least one stabilizer comprises at least one sterically hindered phenol antioxidant.

14. The stabilizer additive systems of claim 7 wherein said at least one stabilizer comprises at least one sterically hindered phenol antioxidant.

15. The stabilizer additive system of claim 11, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl)benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(1H,3H,5H)trione.

16. The stabilizer additive system of claim 12, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl)benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(1H,3H,5H)-trione.

17. The stabilizer additive system of claim 13, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl)benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(1H,3H,5H)-trione.

18. The stabilizer additive system of claim 14, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl)benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(3H,3H,5H)-trione.

19. The stabilizer additive system of claim 1 wherein said second melting temperature is from about 50° C. to about 80° C.

20. The stabilizer additive system of claim 1 wherein said second melting temperature is about 100° C. or less and said processing aid is selected from the group consisting of fatty acids and fatty alcohols comprising a carbon chain having from about 12 to about 22 carbon atoms, amides thereof, and combinations thereof.

21. The stabilizer additive system of claim 20 wherein said second melting temperature is from about 50° C. to about 80° C.

22. The stabilizer additive system claim 11 wherein said second melting temperature is about 100° C. or less and said processing aid is selected from the group consisting of fatty acids and fatty alcohols comprising a carbon chain having from about 12 to about 22 carbon atoms, amides thereof, and combinations thereof.

23. The stabilizer additive system of claim 22 wherein said second melting temperature is from about 50° C. to about 80° C.

24. The stabilizer additive system of claim 12 wherein said second melting temperature is about 100° C. or less and said processing aid is selected from the group consisting of fatty acids and fatty alcohols comprising a carbon chain having from about 12 to about 22 carbon atoms, amides thereof, and combinations thereof.

25. The stabilizer additive system of claim 24 wherein said second melting temperature is from about 50° C. to about 80° C.

26. The stabilizer additive system of claim 13 wherein said second melting temperature is about 100° C. or less and said processing aid is selected from the group consisting of fatty acids and fatty alcohols comprising a carbon chain having from about 12 to about 22 carbon atoms, amides thereof, and combinations thereof.

27. The stabilizer additive system of claim 26 wherein said second melting temperature is from about 50° C. to about 80° C.

28. The stabilizer additive system of claim 14 wherein said second melting temperature is about 100° C. or less and said processing aid is selected from the group consisting of fatty acids and fatty alcohols comprising a carbon chain having from about 12 to about 22 carbon atoms, amides thereof, and combinations thereof.

29. The stabilizer additive system of claim 28 wherein said second melting temperature is from about 50° C. to about 80° C.

30. The stabilizer additive system of claim 18 wherein said second melting temperature is about 100° C. or less and said processing aid is selected from the group consisting of fatty acids and fatty alcohols comprising a carbon chain having from about 12 to about 22 carbon atoms, amides thereof, and combinations thereof.

31. The stabilizer additive system of claim 30 wherein said second melting temperature is from about 50° C. to about 80° C.

32. A stabilizer additive system for polymers comprising pellets comprising:
an amount of at least one stabilizer having a first melting temperature, said stabilizer comprising at least one sterically hindered phenol antioxidant having the following general formula:

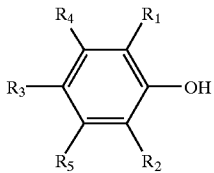

wherein
$R_1$ and $R_2$ independently are selected from the group consisting of substituents which provide sufficient bulk to prevent conversion of the —OH group to an oxygen radical; and
$R_3$, $R_4$ and $R_5$ independently are selected from the group consisting of hydrogen, alkyl groups, aromatic groups, and heterocyclic groups comprising elements selected from the group consisting of nitrogen, oxygen, phosphorus, and sulphur;
a quantity of a mold release agent having a second melting temperature lower than said first melting temperature, said mold release agent comprising one or more powders of mono-esters and di-esters of glycerol with a fatty acid having from about 12 to about 22carbon atoms;

wherein said amount of said stabilizer and said quantity of said mold release agent comprise a combined total weight, said amount of said stabilizer being less than 50 wt % of said combined total weight.

33. The stabilizer additive system of claim 32 wherein said combined total weight comprises a weight ratio of said mold release agent to said stabilizer of from greater than about 1:1 to about 70:1.

34. The stabilizer additive system of claim 32 wherein said combined total weight comprises a weight ratio of said mold release agent to said stabilizer of from greater than about 1:1 to about 10:1.

35. The stabilizer additive system of claim 34 comprising
sufficient coherence to provide abrasion resistance during handling but insufficient coherence to interfere with dispersibility of said additive system in said polymers; and
a Hosakawa flowability of about 70 or more;
a loose bulk density of from about 400 g/l or greater; and,
an average diameter (x) of from about 2 millimeters to about 6 millimeters, and an average length of from about 1.5x to about 3x.

36. The stabilizer additive system of claim 32, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl) benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(1H,3H,5H)-trione.

37. The stabilizer additive system of claim 34, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl) benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(1H,3H,5H)-trione.

38. A pelleted additive system for polymers made by a process comprising:
forming a substantially homogeneous mixture comprising:
an amount of at least one stabilizer having a first melting temperature, said stabilizer being selected from the group consisting of an antioxidant, a UV light stabilizer, and a combination thereof, and
a quantity of at least one processing aid that is a mold release agent or lubricant, or both, said processing aid having a second melting temperature lower than said first melting temperature, said amount of said stabilizer and said quantity of said processing aid comprising a combined total weight, said amount of said stabilizer being less than 50 wt % of said combined total weight; and
processing said mixture to form pellets under conditions that are effective to melt said processing aid but ineffective to melt said stabilizer.

39. The pelleted additive system of claim 38 wherein said processing comprises extrusion and said conditions comprise a temperature of extrusion of about 100° C. or less.

40. The pelleted additive system of claim 38 wherein said processing comprises extrusion and said conditions comprise a temperature of extrusion of about 70° C. or less.

41. The pelleted additive system of claim 38 wherein said combined total weight comprises a weight ratio of said mold release agent to said stabilizer of from greater than about 1:1 to about 70:1.

42. The pelleted additive system of claim 38 wherein said combined total weight comprises a weight ratio of said mold release agent to said stabilizer of from greater than about 1:1 to about 10:1.

43. The pelleted additive system of claim 42 comprising
sufficient coherence to provide abrasion resistance during handling but insufficient coherence to interfere with dispersibility of said additive system in said polymers; and a Hosakawa flowability of about 70 or more;

a loose bulk density of from about 400 g/l or greater; and, an average diameter (x) of from about 2 millimeters to about 6 millimeters, and an average length of from about 1.5x to about 3x.

44. The pelleted additive system of claim 38, wherein said sterically hindered phenol antioxidant is selected from the group consisting of:

octadecyl 3,5-di-t-butyl-4-hydroxyhydrocinnamate;
tetrakis [methylene(3,5-di-t-butyl-4-hydroxylhydrocinnamate)]methane;
1,3,5-trimethyl-2,4,6-tris-(3,5-di-t-butyl-4-hydroxybenzyl) benzene;
1,3,5-tris-(3,5-di-t-butyl-4-hydroxybenzyl)isocyanurate, and,
1,3,5-tris-(4-t-butyl-3-hydroxy-2,6-dimethylbenzyl)-1,3,5-triazine-2,4,6-(1H,3H,5H)-trione.

45. The pelleted additive system of claim 38 wherein said second melting temperature is about 100° C. or less and said processing aid is selected from the group consisting of fatty acids, glycerol, fatty alcohols, compounds comprising sufficient fatty acid chains.

46. The pelleted additive system of claim 35 wherein said second melting temperature is from about 50° C. to about 80° C.

47. The pelleted additive system of claim 34 wherein said processing aid comprises a mold release agent said mold release agent comprising one or more powders of mono-esters and di-esters of glycerol with a fatty acid having from about 12 to about 22 carbon atoms.

48. The pelleted additive system of claim 39 wherein said processing aid comprises a mold release agent, said mold release agent comprising one or more powders of mono-esters and di-esters of glycerol with a fatty acid having from about 12 to about 22 carbon atoms.

49. A method for manufacturing pellets of a stabilizer additive system comprising:
forming a substantially homogeneous mixture comprising:
an amount of at least one stabilizer having a first melting temperature, said stabilizer being selected from the group consisting of an antioxidant, a UV light stabilizer, and a combination thereof, and
a quantity of at least one processing aid that is a mold release agent or lubricant, or both, said processing aid having a second melting temperature lower than said first melting temperature, said amount of said stabilizer and said quantity of said processing aid comprising a combined total weight, said amount of said stabilizer being less than 50 wt % of said combined total weight; and processing said mixture to form pellets under conditions that are effective to melt said processing aid but ineffective to melt said stabilizer.

50. The method of claim 49 wherein said processing comprises extrusion, and said conditions comprise a temperature of extrusion of about 100° C. or less.

51. The method of claim 49 wherein said processing comprises extrusion and said conditions comprise a temperature of extrusion of about 70° C. or less.

52. The method of claim 50 comprising a pellet yield of about 90 wt. % or more.

53. A stabilizer additive system according to claim 1 wherein said stabilizer is 1,3,5-trimethyl-2,4,6-tris(3,5-di-tert-butyl-4-hydroxybenzyl)-benzene, and wherein said pellets comprise at least sodium benzoate or calcium stearate.

54. A stabilizer additive system according to claim 32 wherein said stabilizer is 1,3,5-trimethyl-2,4,6-tris(3,5-di-tert-butyl-4-hydroxybenzyl)benzene, and wherein said pellets comprise at least sodium benzoate or calcium stearate.

55. Pellets made according to the method of claim 50.

56. An additive system for polymers which comprises pellets formed from a substantially homogeneous powder blend and wherein the powder blend comprises: an amount of at least one stabilizer having a first melting temperature, said stabilizer being an antioxidant, a UV light stabilizer, or a combination thereof, and a quantity of at least one processing aid that is a mold release agent or lubricant, or both, said processing aid having a second melting temperature lower than said first melting temperature; wherein said amount of said stabilizer and said quantity of said processing aid comprise a combined total weight, said amount of said stabilizer being less than 50 wt % of said combined total weight.

57. An additive system of claim 56 wherein said processing aid is a compound selected from the group consisting of fatty acids, salts of fatty acids, amides of fatty acids, fatty alcohols, and fatty acid esters.

58. An additive system of claim 56 wherein said stabilizer comprises a sterically hindered phenol antioxidant.

59. An additive system of claim 56 wherein said processing aid is comprised of a fatty acid ester.

60. An additive system of claim 58 wherein said sterically hindered phenol antioxidant is 1,3,5-trimethyl-2,4,6-tris(3, 5-di-tert-butyl-4-hydroxybenzyl)benzene or 1,3,5-tris(3,5-di-tert-butyl-4-hydroxybenzyl)isocyanurate.

61. An additive system of any of claim 56, 58, or 60 wherein said processing aid is selected from mono-esters and di-esters of glycerol.

62. An additive system of claim 58 wherein said processing aid is octadecyl 3,5-di-tert-butyl-4-hydroxy hydrocinnamate, glyceryl monostearate, glycerol distearate, or oleamide, and wherein said powder blend further comprises sodium benzoate or calcium stearate.

63. An additive system of claim 56 wherein said antioxidant is 1,3,5-trimethyl-2,4,6-tris(3,5-di-tert-butyl-4-hydroxybenzyl)benzene, wherein said processing aid is glyceryl monostearate, glycerol distearate or a combination thereof, and wherein said powder blend further comprises sodium benzoate or calcium stearate.

* * * * *